(12) United States Patent
Satoh et al.

(10) Patent No.: US 7,345,846 B2
(45) Date of Patent: Mar. 18, 2008

(54) TAPE CARTRIDGE

(75) Inventors: Takateru Satoh, Tokyo (JP); Kenji Kotegawa, Tokyo (JP)

(73) Assignee: TDK Corporation, Tokyo (JP)

( * ) Notice: Subject to any disclaimer, the term of this patent is extended or adjusted under 35 U.S.C. 154(b) by 332 days.

(21) Appl. No.: 10/810,273

(22) Filed: Mar. 26, 2004

(65) Prior Publication Data

US 2004/0195417 A1    Oct. 7, 2004

(30) Foreign Application Priority Data

Mar. 27, 2003    (JP)    ............................. 2003-086946

(51) Int. Cl.
*G11B 23/107*    (2006.01)
(52) U.S. Cl. .................... 360/132; 242/248.2
(58) Field of Classification Search ............... 360/132, 360/85, 93, 95; 242/348–348.2
See application file for complete search history.

(56) References Cited

U.S. PATENT DOCUMENTS

| | | | | |
|---|---|---|---|---|
| 6,761,327 | B2 * | 7/2004 | Shiga et al. | 242/348.2 |
| 2002/0185566 | A1 * | 12/2002 | Shiga et al. | 242/348.2 |
| 2004/0056134 | A1 * | 3/2004 | Shiga et al. | 242/348.2 |
| 2004/0206841 | A1 * | 10/2004 | Morita et al. | 242/348.2 |
| 2004/0206842 | A1 * | 10/2004 | Morita et al. | 242/348.2 |
| 2005/0139709 | A1 * | 6/2005 | Shiga et al. | 242/348.2 |

FOREIGN PATENT DOCUMENTS

JP    11-185435 A1    7/1999

OTHER PUBLICATIONS

Patent Abstracts of Japan for JP11-185435 published on Jul. 9, 1999.

* cited by examiner

*Primary Examiner*—Brian E Miller
*Assistant Examiner*—Matthew G. Kayrish
(74) *Attorney, Agent, or Firm*—Darby & Darby P.C.

(57) ABSTRACT

A tape cartridge improving an assembling property of a leader member, for leading out a tape-shaped recording medium, to which a leading edge of the tape is fixed. The tape cartridge accommodates a reel hub unit rotatably, for winding a magnetic recording medium on its periphery, and includes a leader member for holding and fixing a leading edge of the magnetic recording medium. The leader member has a pin member having a pair of collar portions between which the magnetic recording medium is positioned, and a clamp member fitted in between the collar portions from through an opening so formed in a longitudinal direction of a cylindrical body as to extend to end surfaces on both sides of the cylindrical body, and clamping the magnetic recording medium between the pin member and the clamp member itself. Chamfered portions are provided at edge portions of the opening of the clamp member.

4 Claims, 9 Drawing Sheets

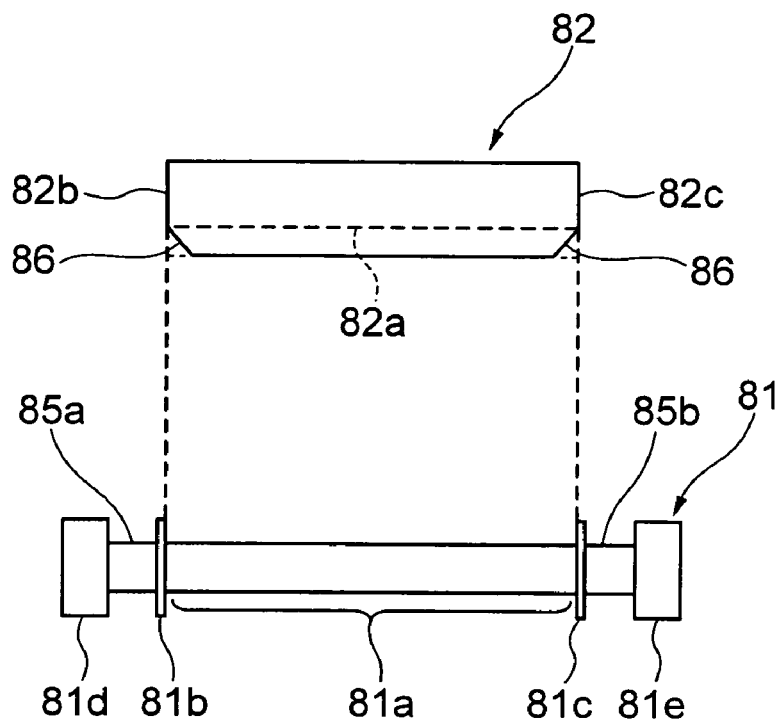
FIG. 5A
FIG. 5B
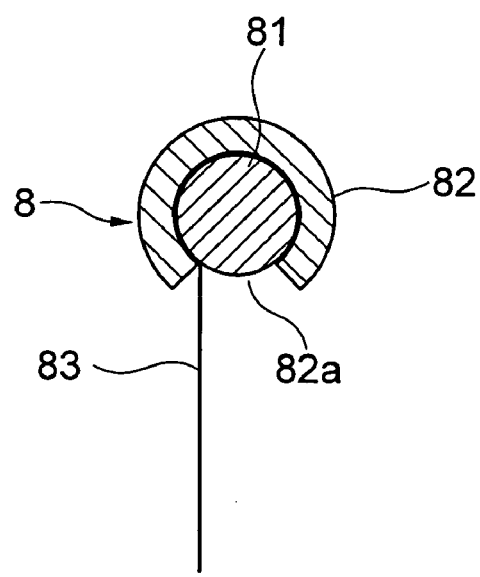
FIG. 5C

TAPE CARTRIDGE

INCORPORATION BY REFERENCE

The present application claims priority under 35 U.S.C. §119 to Japanese Patent Application No. 2003-086946 filed on Mar. 27, 2003. The content of the application is incorporated herein by reference in its entirety.

BACKGROUND OF THE INVENTION

1. Field of the Invention

The present invention relates to a tape cartridge including a leader member to which a leading edge of a tape-shaped recording medium led outside is attached.

2. Description of the Related Art

A 1-reel type tape cartridge accommodates a single reel hub unit constructed of an upper flange and a lower flange. A tape-shaped recording medium is wound along a periphery of the hub unit. The thus constructed tape cartridge is used for storing backup data for a computer, and so forth. When this type of tape cartridge is loaded into a magnetic recording/reproducing apparatus, the tape-shaped recording medium wound along the periphery of the hub of the reel hub unit provided inside is led out and wound on a reel hub unit on the side of a magnetic recording/reproducing apparatus. The tape-shaped recording medium runs between the two reel hub units, whereby recording and reproducing are conducted.

FIG. 10 shows a leader member to which the leading edge of the tape-shaped recording medium led out of the tape cartridge described above is attached. As illustrated in FIG. 10, a leader member 100 is constructed of a pin member 101 and a clamp member 102. The leading edge of a tape-shaped recording medium 110 is held along a periphery of the pin member 101 as the leading edge is clamped by the clamp member 102. When the tape cartridge is loaded into a recording/reproducing apparatus, engagement portions 102 of the leader member 100 engage with a tape lead-out mechanism on the apparatus side (refer to Japanese Patent Application Laid-Open Publication No.11-185435).

When assembling the leader member 100 as shown in FIG. 10, the tape-shaped recording medium 110 is positioned between the pin member 101 and the clamp member 102 and is pinched by intruding the clamp member 102 on an outer peripheral surface of the pin member 101 between collar portions 103 from through an opening 102a. At this time, a specified clearance related to a length of the clamp member 102 and a distance between the collar portions 103 is strict, and hence it happens that the clamp member 102 is forcibly intruded in between the collar portions 103 due to manufacturing errors, etc. in the pin member 101 and the clamp member 102. Consequently, a drawback such as a deformation of the collar portion occurs, an assembling property of the leader member 100 declines, and an assembling efficiency decreases.

SUMMARY OF THE INVENTION

It is an object of the present invention to provide a tape cartridge capable of improving an assembling property of a leader member, for leading out a tape-shaped recording medium, to which a leading edge of the tape-shaped recording medium is fixed.

A tape cartridge in an embodiment accommodates a reel hub unit rotatably, for winding a tape-shaped recording medium on its periphery, and includes a leader member for holding and fixing a leading edge of the tape-shaped recording medium. The leader member has a pin member having a pair of collar portions between which the tape-shaped recording medium is positioned, and a clamp member fitted in between the collar portions from through an opening so formed in a longitudinal direction of a cylindrical body as to extend to end surfaces on both sides of the cylindrical body, and clamping the tape-shaped recording medium between the pin member and the clamp member itself. Chamfered portions are provided at edge portions of the opening of the clamp member.

According to this tape cartridge, when the clamp member is fitted from through the opening in a way that pinches the tape-shaped recording medium between the collar portions of the pin member, the chamfered portions provided at the edges of the opening facilitate fitting the clamp member between the collar portions of the pin member. Hence, there is no hindrance to fitting the clamp member to the pin member, thereby improving an assembling property of the leader member.

In the tape cartridge, it is preferable that each of the chamfered portions is formed over to an end surface of the cylindrical body that faces the collar portion, to a side surface extending in the longitudinal direction of the opening and to an outer peripheral surface of the cylindrical body. For example, the chamfered portion may be provided at a shoulder of the edge of the opening, at which these three surfaces intersect each other. It is also preferable that the chamfered portions be provided at both of shoulders facing each other with the opening interposed therebetween.

It is preferable that a length of the chamfered portion in a direction of the side surface extending in the longitudinal direction, falls within a range of 0.1 through 2 mm. It is further preferable that a chamfering angle made by a chamfering line of the chamfered portion and by the side surface extending in the longitudinal direction, falls within a range of 20 through 50 degrees.

BRIEF DESCRIPTION OF THE DRAWINGS

FIG. 5A is a side view of a clamp member in FIG. 1;

FIG. 5B is a side view of a pin member;

FIG. 5C is a cross-sectional view showing a leader member in which a magnetic recording tape is caught by the pin member and the clamp member is fitted thereon;

DETAILED DESCRIPTION OF THE PREFERRED EMBODIMENTS

Figure 1:
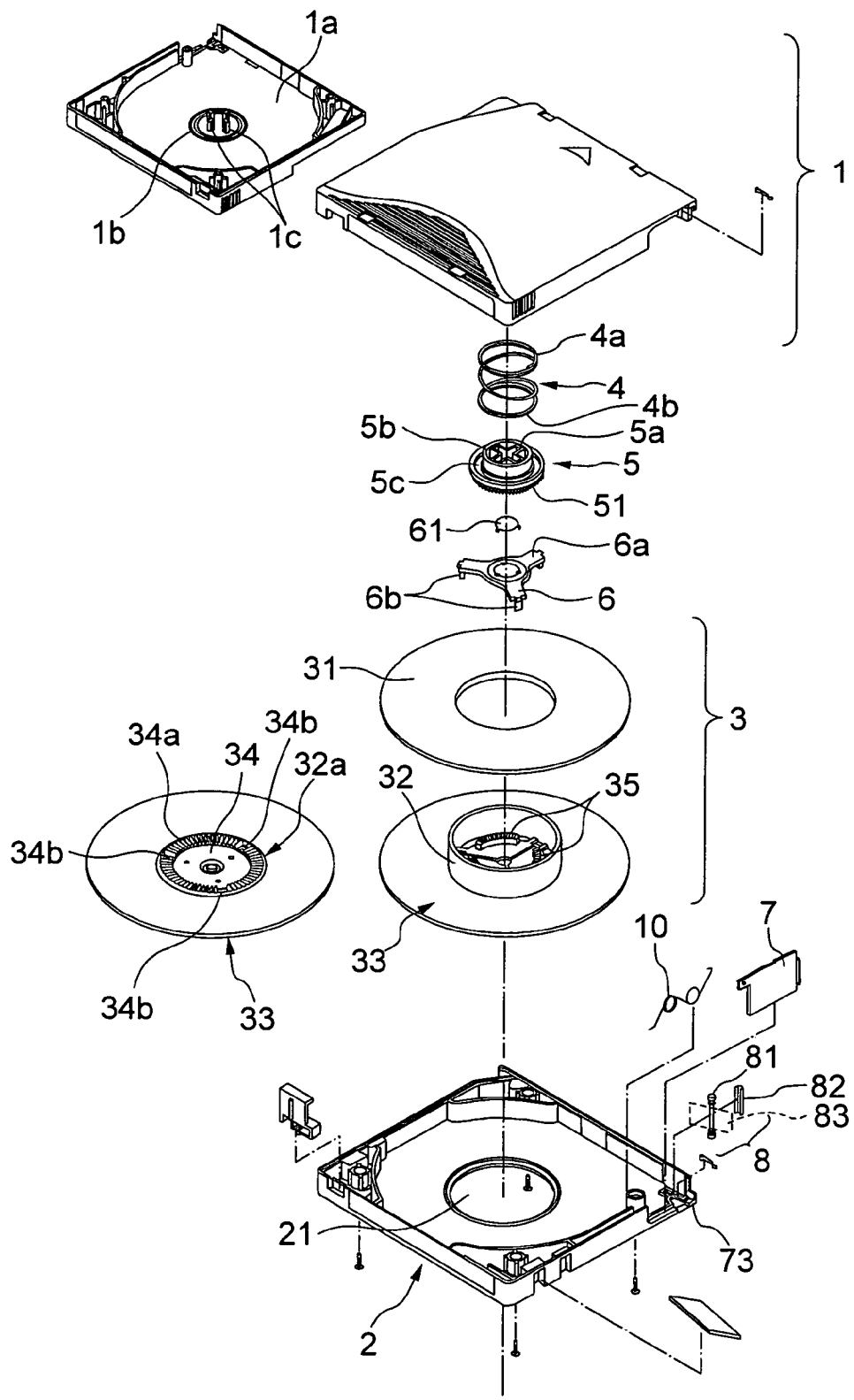
FIG. 1 is an exploded perspective view of a tape cartridge in an embodiment.
Figure 2:
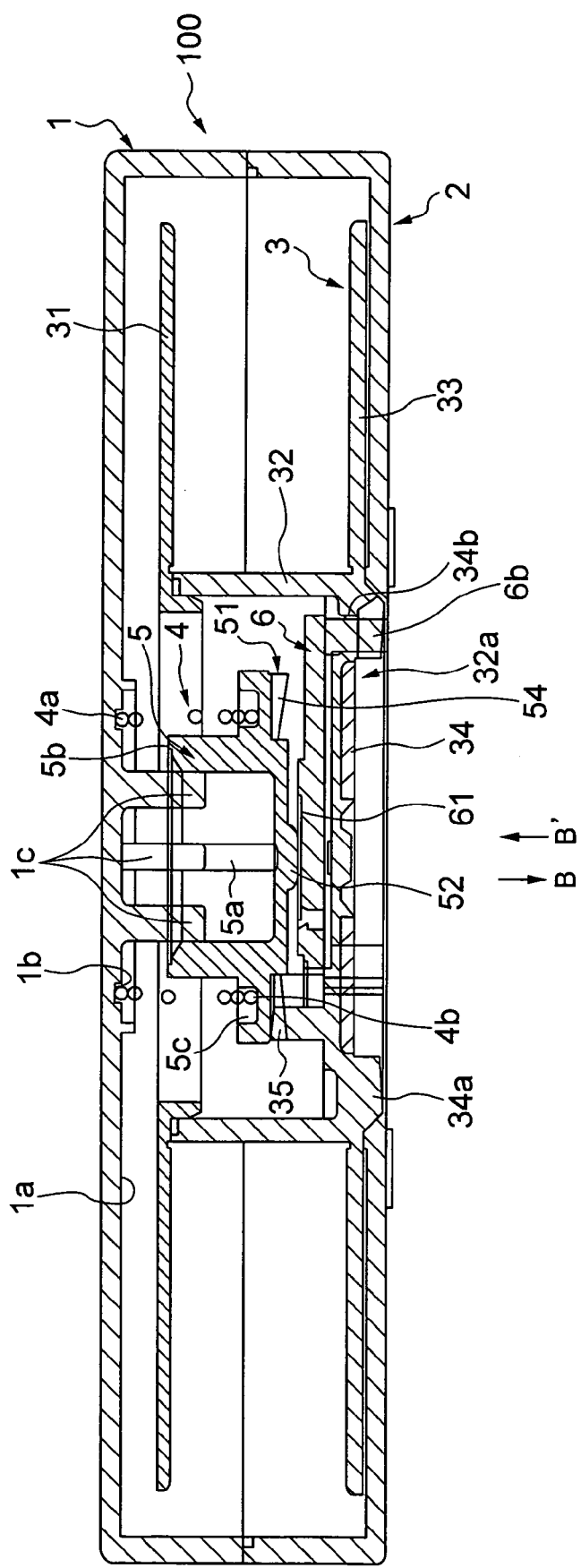
FIG. 2 is a vertical sectional view of the tape cartridge in FIG. 1, showing a state where a reel hub unit is locked in a lock position.
Figure 3:
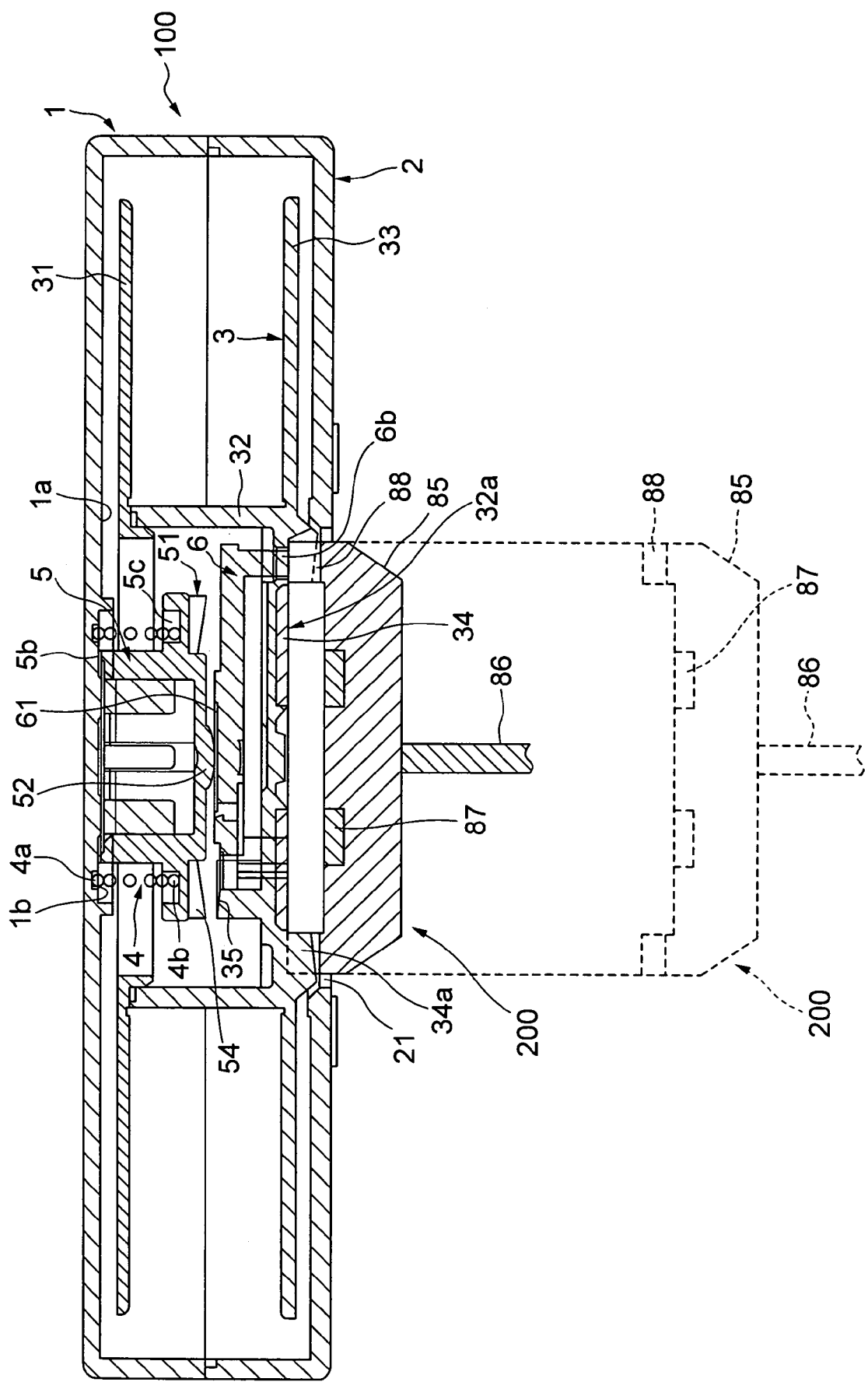
FIG. 3 is a vertical sectional view of the tape cartridge in FIG. 1, showing a state where the reel hub unit is unlocked in an unlock position.

Embodiments of the present invention will hereinafter be described with reference to the accompanying drawings. FIG. 1 is an exploded perspective view of a tape cartridge according to the embodiment of the present invention. FIG. 2 is a vertical sectional view showing a state where a reel hub unit is locked in the tape cartridge in FIG. 1. FIG. 3 is similarly a vertical sectional view showing a state the reel hub unit is unlocked. Note that FIG. 1 also shows a perspective view of an upper case 1 and a hub 32 as viewed from undersurfaces thereof.

A tape cartridge 100 illustrated in FIG. 1 is constructed of the upper case 1 and a lower case 2 in the form of a 1-reel type taking a rectangular flat shape. The tape cartridge 100 incorporates a reel hub unit wound with a magnetic recording tape defined as a tape-shaped recording medium (which might also simply be termed a "tape"), and is configured so that the reel hub unit 3 becomes rotatable when installed in a recording/reproducing apparatus. The upper case 1 and the lower case 2 can be manufactured respectively as molded of a resinous material.

The reel hub unit 3 includes, an upper flange 31, a lower flange 33 and the hub 32 formed integrally with the lower flange 33 and wound with the magnetic recording tape on its peripheral surface. Further, as illustrated in FIG. 1, a circular metal plate 34 composed of a soft magnetic body is integrally provided on the side of a lower surface 32a of the hub 32. Engagement teeth 34a engaging with teeth of a drive member 85 (FIG. 3) of the recording/reproducing apparatus are segmented into three segments in a circumferential direction along a periphery of the metal plate 34. A plurality of holes 34b are formed between the respective engagement teeth 34a, extending in penetration to an opposite surface of the lower surface 32a. The metal plate 34, the engagement teeth 34a and the plurality of holes 34b are exposed to the outside via a through-hole 21 formed in the lower case 2.

A tooth unit 35 including a multiplicity of teeth arranged in a circular shape so as to mesh with a tooth unit 51 of a brake lock member 5, is segmented into a plurality of segments in the circumferential direction on the surface opposite to the lower surface 32a inwardly of the hub 32. The tooth unit 35 can be manufactured as molded of a resinous material such as polycarbonate (PC), however, strength thereof may be enhanced by mixing it with a glass fiber in this case.

As shown in FIGS. 1 and 2, the brake lock member 5 is disposed inwardly of the hub 32, and includes the tooth unit 51 of which the multiplicity of teeth are arranged to mesh with the tooth unit 35 of the hub 32, a cross-shaped engagement hole 5a formed in a cylindrical end surface having a diameter smaller than that of the tooth unit 51, a peripheral edge 5b formed along a periphery of the cross-shaped hole 5a, and a ring-shaped groove 5c formed to accommodate a peripheral edge portion 4b of a brake lock spring 4 on the side of an undersurface of the tooth unit 51. The brake lock member 5 can be manufactured as molded of a resinous material such as POM (polyoxymethylene).

The brake lock member 5 is, as shown in FIGS. 1 and 2, attached to the upper case 1 in such a way that a plurality of engagement protruded pieces 1a erected on an inner surface 1a of the upper case 1 enter the cross-shaped hole 5a and thus engage therewith so as to be movable in vertical directions in FIG. 1. The brake lock spring 4 is structured so that its front side end 4a is fitted into the ring-shaped groove 1b formed in the inner surface 1a of the upper case 1. The brake lock spring 4 is interposed between the ring-shaped groove 1b of the upper case 1 and the ring-shaped groove 5c of the brake lock member 5, and constantly biases the brake lock member 5 in a direction B in FIG. 2 with the result that the tooth unit 51 meshes with the tooth unit 35 of the hub 32, thereby generating a brake state in a way that hinders rotations of the reel hub unit 3.

A brake canceling member 6 is disposed between the hub 32 and the brake lock member 5. The brake canceling member 6 includes main plates 6a and a plurality of leg pieces 6b protruding downwards as viewed in FIG. 1 from a plurality of peripheral edges of the main plates 6a. The plurality of leg pieces 6b are inserted into a plurality of holes 34b formed in the lower surface of the hub 32. The leg pieces 6b of the brake canceling member 6 are, when the tape cartridge is loaded into the recording/reproducing apparatus, pushed from under in FIG. 1 and thus raised up. The brake lock member 5 is, as illustrated in FIG. 3, raised up at its central convex bearing portion 52 through an abutting plate 61 of the brake canceling member 6, resisting the biasing force of the brake lock spring 4, and is moved to a non-lock position so that the peripheral edge 5b gets proximal to the inner surface 1a.

A leading edge 83 (depicted by a broken line in FIG. 1) of the magnetic recording tape wound on the reel hub unit 3 is fixed to a leader member 8. In the leader member 8, the leading edge 83 of the magnetic recording tape is wound on a pin member 81 and then fixed (clamped) by a clamp member 82 fitted thereon. When the tape cartridge is loaded into the recording/reproducing apparatus, the leader member 8 engages with and is thus held by a holding member on the apparatus side, whereby the tape is led on the apparatus side out of a tape lead-out port 73 (FIG. 1).

The tape lead-out port 73 is opened and closed by a door member 7. The door member 7 is constantly biased by a spring member 10 in such a direction as to close the tape lead-out port 73. When loaded into the recording/reproducing apparatus, the tape lead-out port 73 is opened by an opening member (unillustrated) on the apparatus side, resisting the biasing force of the spring member 10.

In the tape cartridge shown in FIGS. 1 through 3, when not in use such as being stored and so on, the brake lock member 5 is biased by the brake lock spring 4 and is, as illustrated in FIG. 2, moved to a lock position, wherein teeth 54 of the tooth unit 51 of the brake lock member 5 mesh with teeth of the tooth unit 35 of the hub 32 of the reel hub unit 3. The reel hub unit 3 is thereby brought into the brake state and is thus unable to rotate, with the result that the unnecessary rotation is prevented and the magnetic recording tape can be prevented from slackening.

Figure 6:
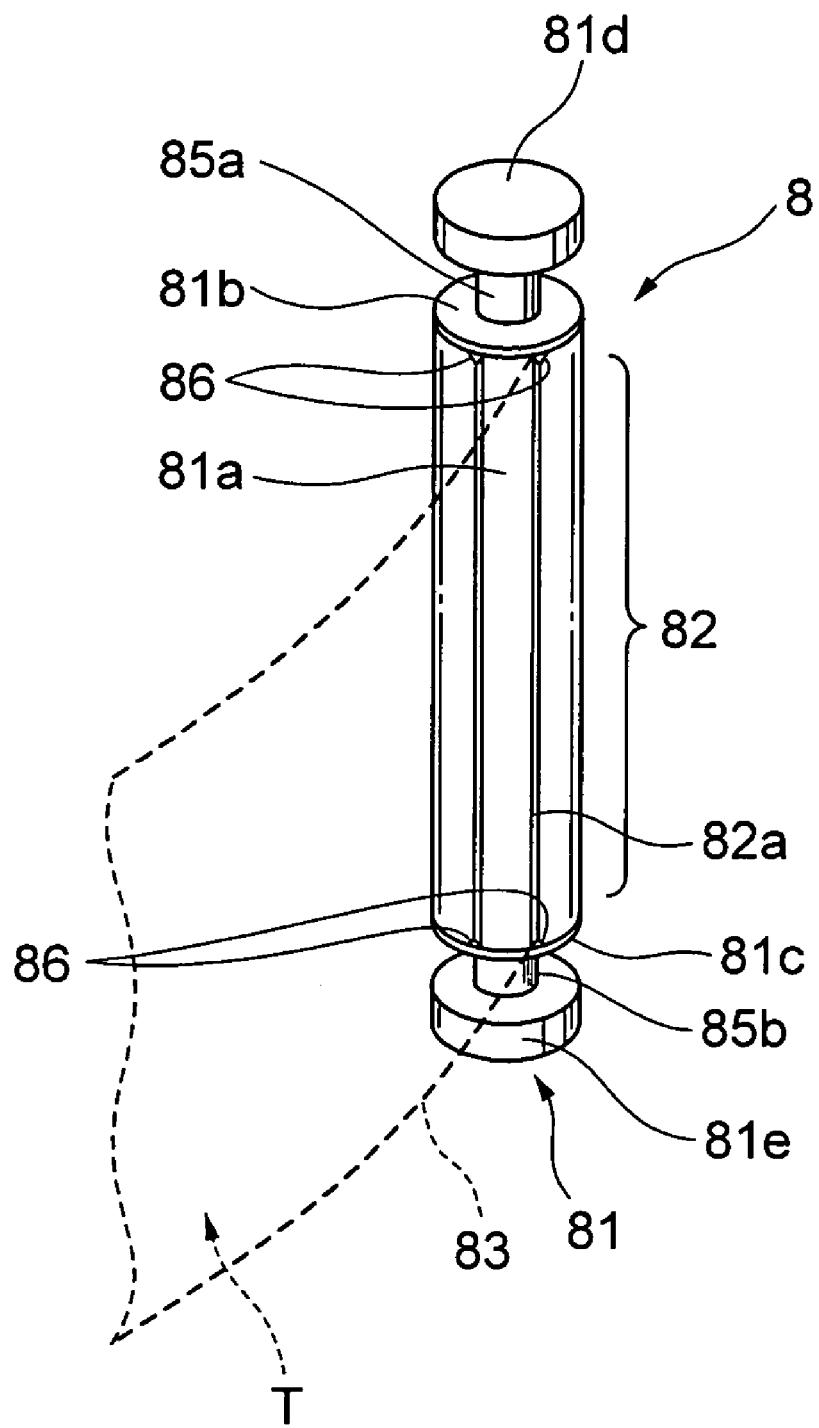
FIG. 6 is a perspective view of the leader member in FIG. 5C.

The leader member will be described with reference to FIGS. 5A through 5C and 6. FIG. 5A is a side view of the clamp member. FIG. 5B is a side view of the pin member. FIG. 5C is a cross-sectional view showing the leader member in which the magnetic recording tape is caught by the pin member and clamped by the clamp member fitted thereon. FIG. 6 is a perspective view of the leader member in FIG. 5C.

As illustrated in FIGS. 1 and 5A through 5C, the leader member 8 is constructed of the pin member 81 formed in an elongated shape on the whole and of the clamp member 82 fitted on the pin member 81.

The pin member 81 includes, as shown in FIGS. 5A through 5C, a core bar 81a wound with the magnetic recording tape, collar portions 81b, 81c disposed at both edges of the core bar 81a and formed comparatively thin in thickness, disk portions 81d, 81e provided at both ends, and recessed engagement portions 85a, 85b formed respectively between the collar portions 81b, 81c and the disk portions 81d, 81e. The pin member 81 is composed of a metal material such as a stainless steel.

The clamp member 82 is, as shown in FIGS. 5A and 6, configured of an elongated cylindrical body and includes an opening 82a formed extending from one side end surface 82b to the other side end surface 82c in a longitudinal direction, and chamfered portions 86 formed at edges of the opening 82a. The clamp member 82 can be manufactured as injection-molded of a resinous material such as PC (polycarbonate), POM (polyoxymethylene), PA (polyamide).

The clamp member assumes substantially a C-shape in cross-section as shown in FIG. 5C by virtue of the opening 82a, and a length of the clamp member 82 corresponds to a length of the core bar 81a. The leading edge 83 (drawn by a broken line in FIG. 6) of the magnetic recording tape from the opening 82a, is pinched between the collar portions 81b, 81c of the pin member 81 and fitted on the core bar 81a. The leading edge 83 of the magnetic recording tape T is inserted in between the outer peripheral surface of the core bar 81a and the inner peripheral surface of the clamp member 82 and is fixed by clamping.

Figure 4:
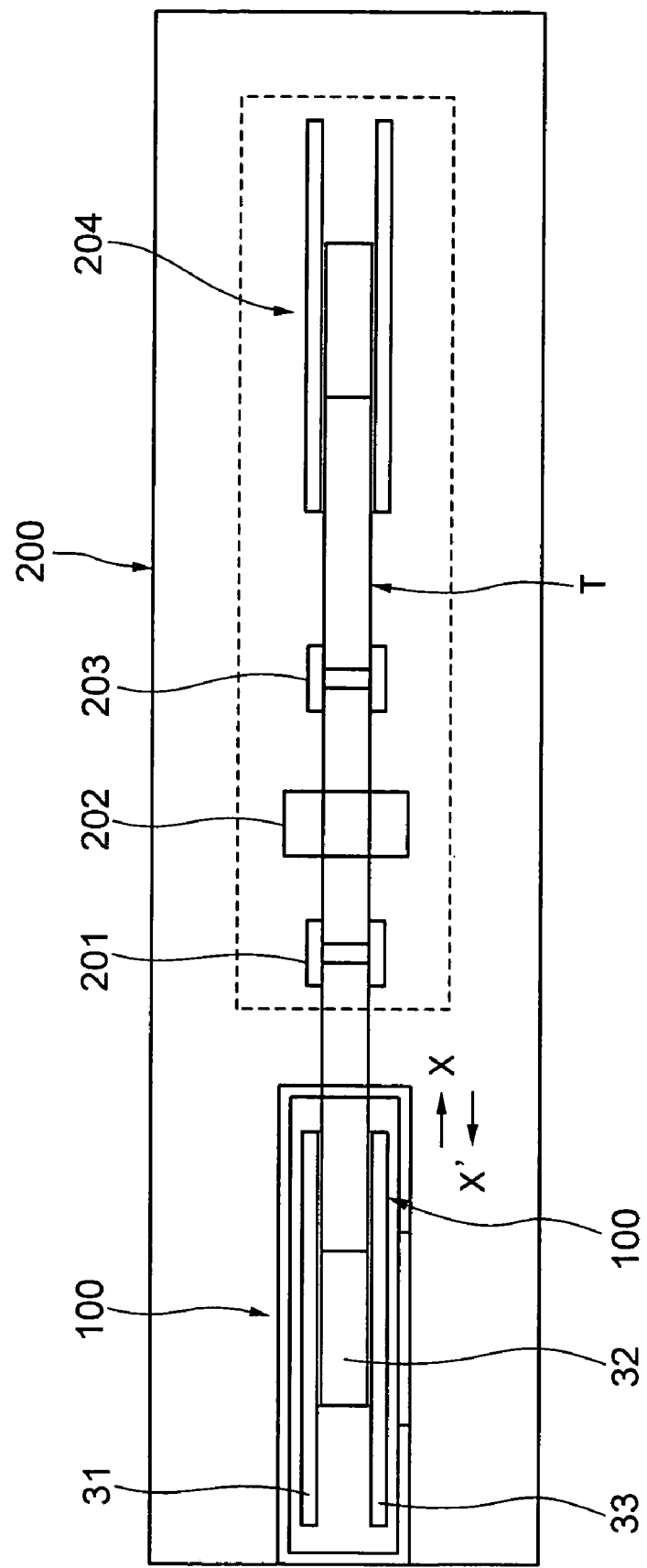
FIG. 4 is a front view conceptually illustrating a running route of the tape led out of the tape cartridge shown in FIGS. 1 through 3 towards a recording/reproducing apparatus.

Next, a case of loading the tape cartridge into the recording/reproducing apparatus will be explained referring further to FIG. 4. FIG. 4 is a front view conceptually illustrating a running route of the tape led out of the tape cartridge shown in FIGS. 1 through 3 in the recording/reproducing apparatus.

As shown in FIG. 3, the drive member 85 on the side of an apparatus 200 has a tooth unit 88 formed on its outer periphery. The tooth unit 88 engages with the engagement teeth 34a of the hub 32. The drive member 85 has ring-shaped magnets 87 embedded therein on the side of an inner periphery of the tooth unit 88.

As illustrated in FIG. 4, when the tape cartridge 100 is loaded into the recording/reproducing apparatus 200, the drive member on the side of the apparatus 200 and the tape cartridge 100 get relatively approached. Then, the drive member 85 passes through the through-hole 21 of the lower case 2. The magnets 87 of the drive member 85 approach and magnetically attract the metal plate 34 composed of the soft magnetic body on the side of the lower surface 32a of the hub 32, and the tooth unit 88 of the drive member 85 engages with the engagement teeth 34a of the hub 32. Then, the brake canceling member 6 moves in a direction B' (opposite to the direction B) in FIG. 2 by use of its leg portions 6b with the aid of the protrusions of the tooth unit 88 of the drive member 85, whereby the brake lock member 5 moves by a fixed stroke while resisting the biasing force of the brake lock spring 4 and reaches the non-lock position as shown in FIG. 3. Then, the tooth unit 51 and the tooth unit 35 come to have a gap therebetween and thus disengage from each other. As a result, rotations of a drive shaft 86 of the drive member 85 enable the reel hub unit 3 to rotate.

Next, the door member 7 is opened by an opening member (unillustrated) on the side of the recording/reproducing apparatus 200, and the leader member 8 is, through the engagement portions 85a, 85b in FIG. 6, engaged with and thus held by the holding member (not shown) on the side of the apparatus 200, whereby the magnetic recording tape is led out on the side of the apparatus 200 and wound along the periphery of the hub of the reel hub unit 204. Then, the reel hub unit 3 of the tape cartridge 100 and the reel hub unit 204 of the recording/reproducing apparatus 200 are rotationally driven. Consequently, as shown in FIG. 4, the magnetic recording tape T is guided by guides 201, 203 on both sides of a recording/reproducing head 202 in a horizontal direction X or a horizontal direction X' opposite to X. The magnetic recording tape T is, during its running, subjected to recording or reproducing by the recording/reproducing head 202.

Figure 7A:
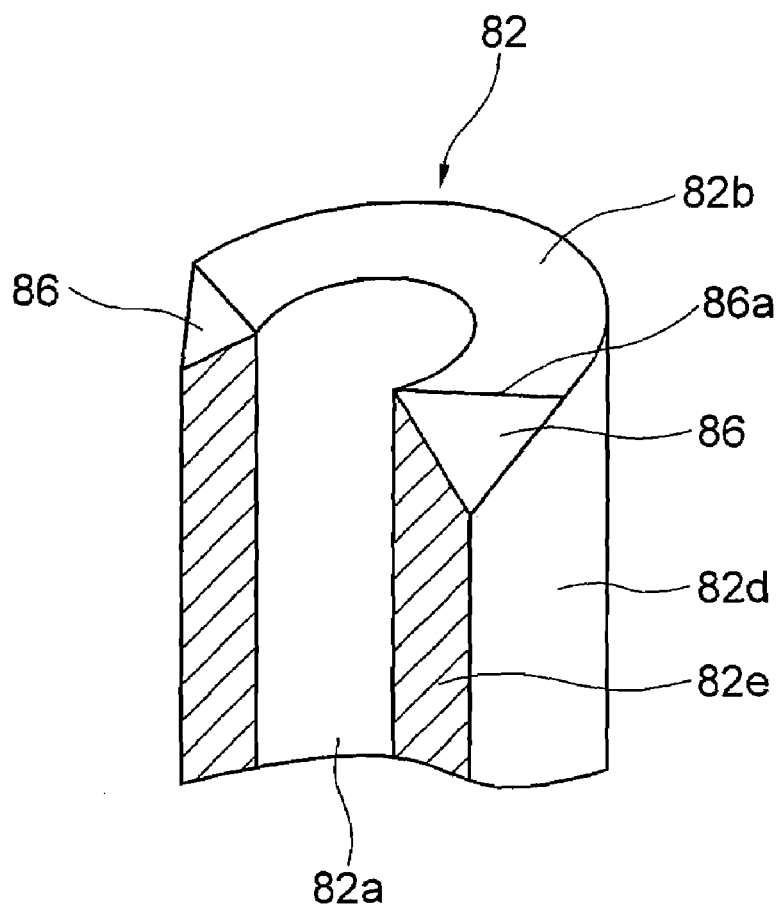
FIG. 7A is a principal perspective view showing one end surface of the clamp member in FIG. 5A.
Figure 7B:
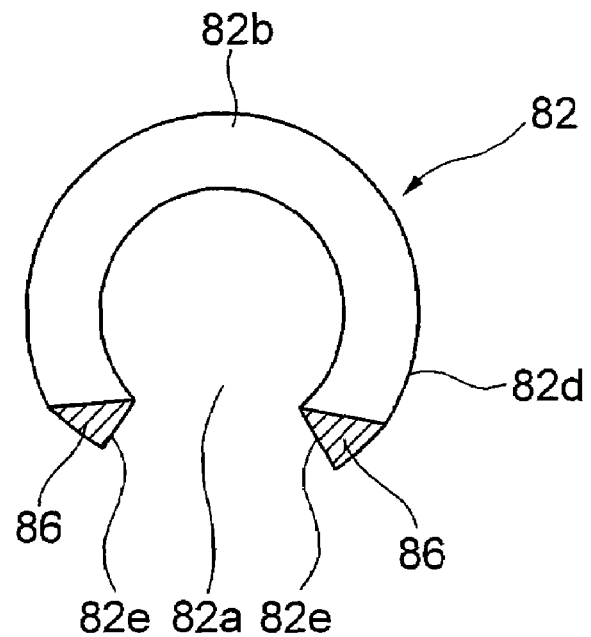
FIG. 7B is a plan view showing one end surface of the clamp member.
Figure 8:
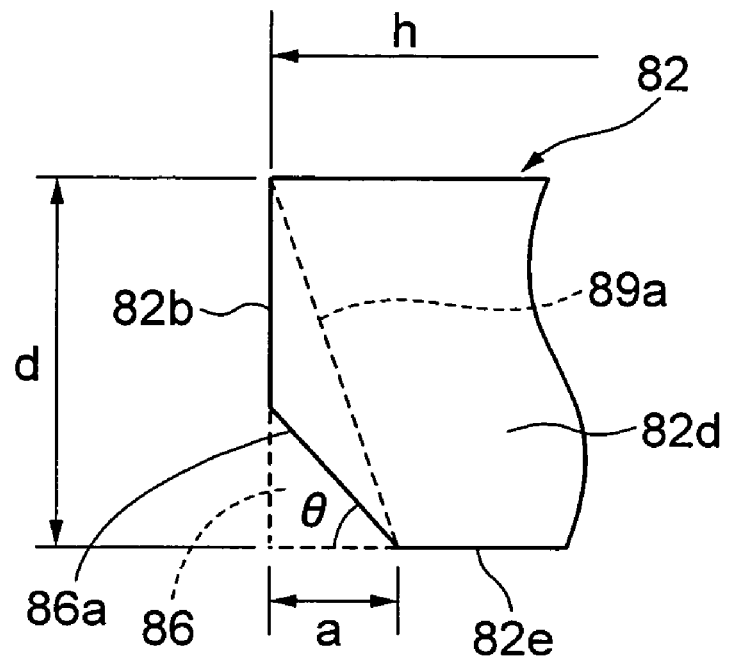
FIG. 8 is a principal side view of one end surface of the clamp member in FIG. 7A.

Next, the clamp member shown in FIGS. 5A through 5C and 6 will be described in greater detail with reference to FIGS. 7A, 7B and 8. FIG. 7A is a principal perspective view showing one end surface of the clamp member. FIG. 7B is a plan view showing one end surface of the clamp member. FIG. 8 is a principal side view of one end surface of the clamp member.

As illustrated in FIGS. 7A and 7B, two pieces of chamfered portions 86, 86 of the clamp member 82 are formed in a face-to-face relationship in one side end surface 82b of the cylindrical body with the opening 82a interposed between these portions 86, 86. To be specific, the chamfered portion 86 is formed by cutting off a shoulder of an intersection between one side end surface 82b of the cylindrical body, the outer peripheral surface 82d of the cylindrical body and a side end surface 82e delimited (formed) by the opening 82a and extending on the longitudinal direction. Further, the other side end surface 82c of the clamp member 82 also has two pieces of similar chamfered portions 86, 86 formed facing each other with the opening 82a interposed therebetween.

As described above, the respective chamfered portions 86 formed in the end surfaces 82b, 82c on both sides of the clamp member 82, as shown in FIGS. 5A and 5B, facilitate fitting the clamp member 82 on the core bar 81a between the collar portions 81b, 81c of the pin member 81, with the magnetic recording tape sandwiched in between the clamp member and the core bar 81a. Accordingly, even if manufacturing errors, etc. occur in the pin member 81 and in the clamp member 82, when the leader member 8 is automatically assembled by an automatic assembly machine, it does not happen that the clamp member 82 is forcibly intruded in between the collar portions 81b, 81c as done by the prior arts. It is therefore possible to restrain an occurrence of drawbacks such as deformations of the collar portions 81b, 81c. Hence, an assembling property of the leader member 8 is improved, whereby a production efficiency of the leader member 8 can be likewise enhanced.

As illustrated in FIG. 8, the clamp member 82 is configured, wherein a length h is, for example, 12.6 mm, a width d is 3,2 mm. A chamfering length a, extending along the side end surface 82e, of the chamfered portion 86 is set to 0.1 through 2 mm, preferably 0.1 through 1.0 mm, more preferably 0.3 through 0.5 mm. Further, a chamfering angle θ made by a chamfering line 86a of the chamfered portion 86 and the side end surface 82e is preferably 20 degrees or larger, more preferably 40 through 50 degrees in terms of acquiring an effect of improvement of the assembling property.

Figure 9:
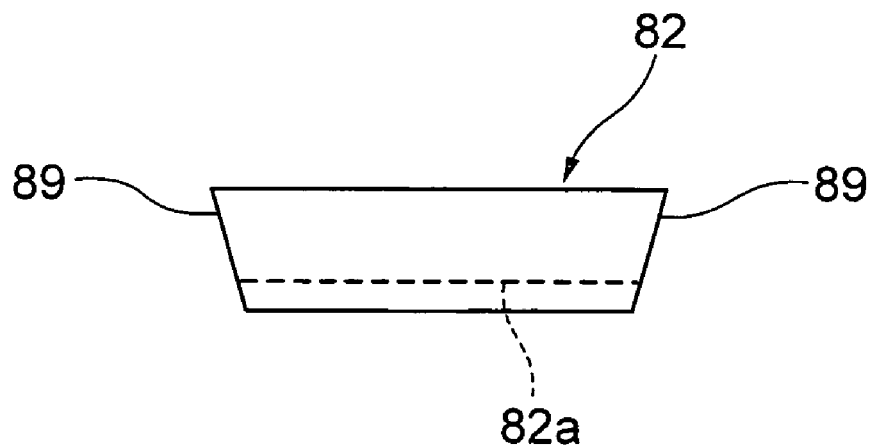
FIG. 9 is a side view showing a modified example of the clamp member in FIG. 8.
Figure 10:
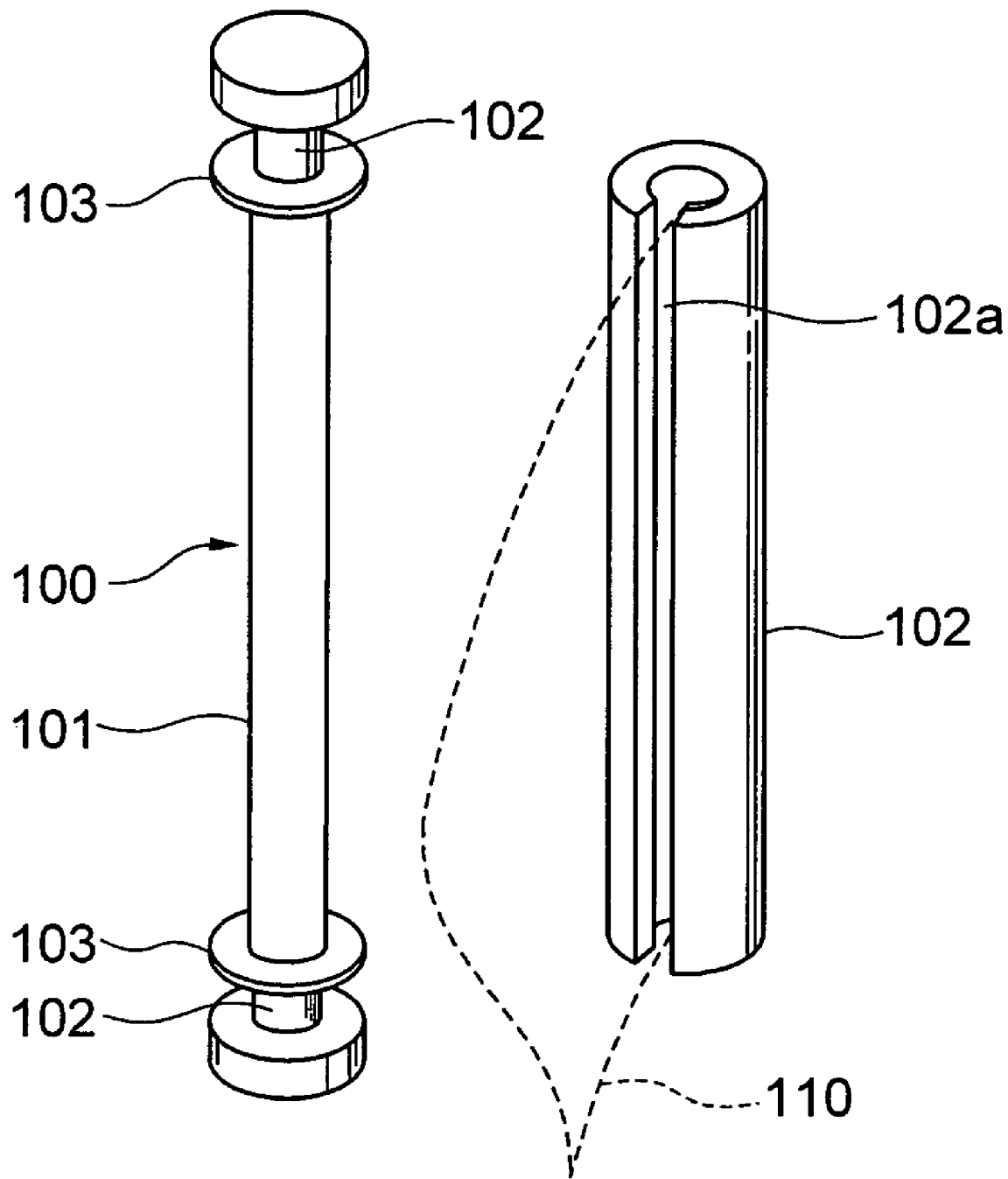
FIG. 10 is a perspective view showing a pin member and a clamp member of a leader member in the prior art.

The present invention has been discussed so far by way of the embodiments and the examples but is not limited to those and can be modified in a variety of forms within the range of the technical concept of the present invention. For example, the chamfered portion of the clamp member 82 is not limited to the shape as shown in FIGS. 7A, 7B and 8. As illustrated in FIG. 9, for instance, the holes of the end surfaces 82b, 82c on both sides of the clamp member 82 may be chamfered along the chamfering line 89a drawn by the broken line in FIG. 8, thereby forming chamfered portions

89, 89. These chamfered portions 89 facilitate working of a molding die assembly for the clamp member.

According to the tape cartridge in this embodiment, it is feasible to improve the assembling property of the leader member serving to lead out the tape-shaped recording medium and constructed of the pin member and the clamp member to which the leading edge of the tape-shaped recording medium is fixed.

What is claimed is:

1. A tape cartridge comprising:
    a reel hub unit, for winding a tape-shaped recording medium on its periphery, rotatably accommodated in said tape cartridge; and
    a leader member for holding and fixing a leading edge of the tape-shaped recording medium,
    wherein said leader member includes a pin member having a pair of collar portions between which the tape-shaped recording medium is positioned, and a clamp member fitted in between said collar portions from through an opening so formed in a longitudinal direction of a cylindrical body as to extend to end surfaces on both sides of said cylindrical body, and clamping the tape-shaped recording medium between said pin member and said clamp member itself, and
    chamfered portions are provided at edge portions of the opening of said clamp member, said chamfered portions each comprising a planar surface completely enclosed by three edges, a first of said three edges being formed between the planar surface of the chamfered portion and an end surface of said cylindrical body facing one of said collar portions, the second of said three edges being formed between the planar surface of the chamfered portion and a side surface of said cylindrical body extending in the longitudinal direction of said opening, and the third of said three edges being formed between the planar surface of the chamfered portion and an outer peripheral surface of said cylindrical body.

2. A tape cartridge according to claim 1, wherein said chamfered portions are provided at each of two side surfaces extending in the longitudinal direction of said opening and facing each other with said opening interposed therebetween.

3. A tape cartridge according to claim 1, wherein a length of said chamfered portion in a direction of the side surface extending in the longitudinal direction, falls within a range of 0.1 through 2 mm.

4. A tape cartridge according to claim 1, wherein a chamfering angle made between a chamfering line of said chamfered portion and by the side surface extending in the longitudinal direction, falls within a range of 20 through 50 degrees.

* * * * *